(12) United States Patent
Summers et al.

(10) Patent No.: US 7,153,598 B2
(45) Date of Patent: Dec. 26, 2006

(54) METHODS OF OPERATING FUEL CELLS HAVING CLOSED REACTANT SUPPLY SYSTEMS

(75) Inventors: David A. Summers, Vancouver (CA); Herwig R. Haas, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 333 days.

(21) Appl. No.: 10/795,114

(22) Filed: Mar. 5, 2004

(65) Prior Publication Data

US 2004/0241504 A1 Dec. 2, 2004

Related U.S. Application Data

(60) Provisional application No. 60/453,027, filed on Mar. 7, 2003.

(51) Int. Cl.
*H01M 8/00* (2006.01)
*H01M 8/10* (2006.01)
*H01M 8/04* (2006.01)

(52) U.S. Cl. .............. 429/13; 429/25; 429/30; 429/17

(58) Field of Classification Search .............. 429/25, 429/13, 30, 17
See application file for complete search history.

(56) References Cited

U.S. PATENT DOCUMENTS

| | | | |
|---|---|---|---|
| 3,553,026 A | 1/1971 | Winsel | 136/86 |
| 3,615,842 A | 10/1971 | Craft et al. | 136/86 |
| 3,697,325 A | 10/1972 | Baude | 136/86 B |
| 3,775,282 A | 11/1973 | Craft et al. | 204/266 |
| 4,769,297 A | 9/1988 | Reiser et al. | 429/17 |
| 5,366,818 A | 11/1994 | Wilkinson et al. | 429/13 |
| 5,441,819 A | 8/1995 | Voss et al. | 429/13 |
| 5,478,662 A | 12/1995 | Strasser | 429/13 |
| 5,879,826 A | 3/1999 | Lehman et al. | 429/13 |
| 6,117,577 A | 9/2000 | Wilson | 429/17 |
| 6,124,054 A | 9/2000 | Gorman et al. | 429/34 |
| 6,423,434 B1 | 7/2002 | Pratt et al. | 429/13 |
| 6,426,158 B1 | 7/2002 | Pratt et al. | 429/13 |
| 6,451,470 B1 | 9/2002 | Koschany et al. | 429/40 |
| 6,461,751 B1 | 10/2002 | Boehm et al. | 429/13 |
| 6,479,177 B1 | 11/2002 | Roberts et al. | 429/13 |
| 6,926,981 B1 * | 8/2005 | Voss | 429/13 |
| 2003/0022041 A1 | 1/2003 | Barton et al. | 429/23 |
| 2003/0064274 A1 | 4/2003 | Blaszczyk et al. | 429/34 |

FOREIGN PATENT DOCUMENTS

| | | |
|---|---|---|
| CA | 2 379 363 | 9/2002 |
| FR | 2 816 761 | 5/2002 |
| GB | 1 223 941 | 3/1971 |

OTHER PUBLICATIONS

Lyczkowski R. et al., "Accumulation and Continuous Removal of Impurities in Fuel Cells: I. One-Dimensional Model," *AIChE Journal* 17(5):1208-1213, 1971.

Lyczkowski R. et al., "Two-Dimensional Inert Accumulation in Space Hydrogen-Oxygen Fuel Cells," *AIChE Journal* 17(5):1131-1140, 1971.

* cited by examiner

*Primary Examiner*—Patrick Joseph Ryan
*Assistant Examiner*—Thomas H. Parsons
(74) *Attorney, Agent, or Firm*—Seed IP Law Group PLLC

(57) ABSTRACT

A fuel cell system is operated with the fuel supply pressure greater than the oxidant supply pressure to the fuel cell. This gives improved performance particularly when the fuel cell system is closed on the fuel side. The magnitude of fuel overpressure may be varied in accordance with variations in the fuel cell operating parameters.

26 Claims, 5 Drawing Sheets

METHODS OF OPERATING FUEL CELLS HAVING CLOSED REACTANT SUPPLY SYSTEMS

CROSS-REFERENCE TO RELATED APPLICATIONS

This application claims the benefit of U.S. Provisional Patent Application No. 60/453,027 filed Mar. 7, 2003, where this provisional application is incorporated herein by reference in its entirety.

BACKGROUND OF THE INVENTION

1. Field of the Invention

The present invention relates to fuel cells and, more particularly, to methods of operating fuel cells having closed fuel supply systems.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels or passages for the fuel and oxidant to the respective anode and cathode surfaces, and provide passages for the removal of reaction products, such as water, formed during operation of the cell.

Certain fuel cells are designed to operate in a closed mode on one or both reactants. Closed reactant supply systems include dead-ended configurations in which a reactant flow passage is generally closed, as well as systems employing closed-loop recirculation of the reactant exhaust stream from the fuel cell outlet to the fuel cell inlet and though the fuel cell with the addition of fresh reactant. In these situations the reactant used on the closed side is generally substantially pure. Typically a purge valve (which is normally closed in closed system operation) is provided somewhere in the reactant flow passage for periodic venting of accumulations of non-reactive components, which can build up in the reactant passages in closed system operation. In conventional fuel cell purge systems the purge valve is opened from time to time, for example, manually or at regular fixed time intervals. Alternatively a purge is triggered, for example, when the voltage or electrical output of one or more cells in a stack falls below a predetermined threshold value (see, for example, GB Patent No. 1 223 941), or when there is a predetermined decrease in electrical power output (see, for example, U.S. Pat. No. 3,553,026), or after the fuel cell has expended a preselected number of ampere-hours (see, for example, U.S. Pat. No. 3,697,325). The reactant flow path through the fuel cell stack can be configured so that non-reactive components tend to accumulate first in just one or a few fuel cells of the stack, rather than in the outlet region of each cell in the stack. The purge system may be controlled via a controller (see, for example, commonly assigned U.S. patent application Publication No. 2003/0022041, now U.S. Pat. No. 6,960,401).

However, although purging can improve performance of fuel cells having closed reactant supply systems, it wastes valuable fuel and increases the parasitic load on the system since purging equipment is required. Furthermore, the release of hydrogen into the ambient environment may be undesirable. Accordingly, there remains a need for improved methods of operating fuel cells having closed reactant supply systems for which purging is not necessary.

BRIEF SUMMARY OF THE INVENTION

The present methods relate to fuel cells and, more particularly, to methods of operating fuel cells having closed fuel supply systems.

In one embodiment, a method for operating a fuel cell system comprising at least one fuel cell stack, the stack comprising at least one fuel cell, the system further comprising a reactant supply system, the reactant supply system comprising a fuel passage for directing a fuel stream through the stack and an oxidant passage for directing an oxidant stream through the stack, the method comprising supplying the oxidant stream to the oxidant passage at an oxidant supply pressure; and supplying the fuel stream to the fuel passage at a fuel supply pressure; wherein the fuel supply pressure is at least 5 psig greater than the oxidant supply pressure at least some of the time and a fuel side of the reactant supply system is closed at least some of the time.

In some embodiments, the fuel cell may be a solid polymer electrolyte fuel cell, and the reactant streams hydrogen and air.

In some embodiments, during operation the fuel supply pressure is always at least 5 psig greater than the oxidant supply pressure, and may be between about 5 psig and 30 psig greater than the oxidant supply pressure. In other embodiments, the fuel supply pressure may be intermittently at least 5 psig greater than the oxidant supply pressure. In still other embodiments, the fuel supply pressure is at least 5 psig greater than the oxidant supply pressure when the fuel side of the reactant supply system is closed.

In some embodiments, the fuel supply pressure may be varied, and the variation may be at a substantially constant frequency, or based on the power output fuel cell system, or based on a parameter indicative of fuel cell performance. In other embodiments, the fuel supply pressure may be varied during different operational phases, such as during shutdown and/or start-up of the fuel cell system.

In some embodiments, the fuel side of the reactant supply system is always closed, such as by having a fuel side of at least one fuel cell dead-ended. In other embodiments, the fuel side of the reactant supply system comprises a recirculation loop for recirculating the fuel stream through the stack. In still other embodiments, the fuel side of the reactant supply system comprises a purge valve which may be periodically opened to discharge a portion of the fuel stream from the stack. In still other embodiments, the fuel side of the reactant supply system may be closed at a plurality of locations, such as having the fuel side of each fuel cell dead-ended. In still further embodiments, the fuel cell system comprises a primary stack and a secondary stack fluidly connected to receive the fuel stream in series downstream of the primary stack, wherein a fuel passage of the secondary stack is dead-ended at least some of the time.

These and other aspects of the present methods will be apparent upon reference to the attached figures and following detailed description.

BRIEF DESCRIPTION OF THE SEVERAL VIEWS OF THE DRAWINGS

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

DETAILED DESCRIPTION OF THE INVENTION

In the following detailed description, certain specific details are set forth in order to provide a thorough understanding of various embodiments of the invention. However, one skilled in the art will understand that the invention may be practiced without these details. In other instances, well known structures associated with fuel cell stacks and fuel cell systems have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to".

Figure 1:
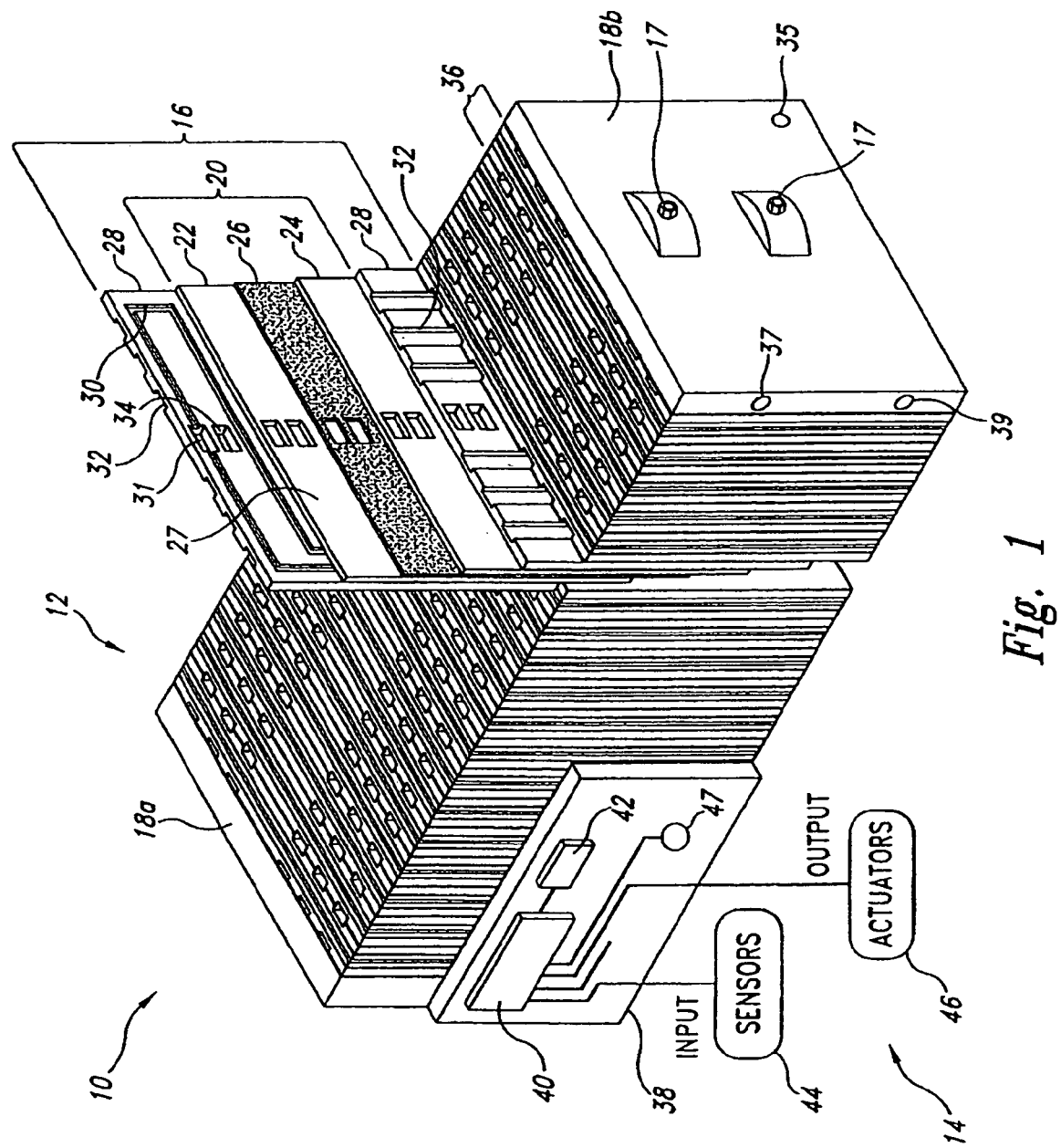
FIG. 1 is an isometric, partially exploded, view of a fuel cell system including a fuel cell stack and controlling electronics.

FIG. 1 shows a portion of a fuel cell system 10, namely, a fuel cell stack 12 and an electronic fuel cell control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent to ion exchange membrane 26 with a catalyst 27, such as a thin layer of platinum, to render each electrode electrochemically active.

Fuel cell assembly 16 also includes a pair of separators or flow field plates 28 sandwiching membrane electrode assembly 20. In the illustrated embodiment, each of flow field plates 28 includes one or more reactant passages 30 formed on a planar surface of flow field plate 28 adjacent an associated one of electrodes 22, 24 for carrying fuel to anode 22 and oxidant to cathode 24, respectively. (Reactant passage 30 on only one of flow field plates 28 is visible in FIG. 1.) Reactant passages 30 that carry the oxidant also carry exhaust air and product water away from cathode 24. As will be described in more detail below, fuel stack 12 is designed to operate in a closed fuel supply mode, thus substantially all of the hydrogen fuel supplied to it during operation is consumed, and little if any hydrogen is carried away from the stack 12 in normal operation of system 10.

Each flow field plate 28 may include a plurality of cooling channels 32 formed on the planar surface of the flow field plate 28 opposite the planar surface having reactant passage 30. When the stack is assembled, the cooling channels 32 of each adjacent fuel cell assembly 16 cooperate so that closed cooling channels 32 are formed between each membrane electrode assembly 20. Cooling channels 32 transmit a coolant fluid through fuel cell stack 12. Cooling channels 32 may be straight and parallel to each other, and traverse each plate 28 so that cooling channel inlets and outlets are located at respective edges of plate 28.

While the illustrated fuel cell system includes two flow field plates 28 in each fuel cell assembly 16, the system may alternatively include a single bipolar flow field plate (not shown) between adjacent membrane electrode assemblies 20. In such systems, a channel on one side of the bipolar plate carries fuel to the anode of one adjacent membrane electrode assembly 20, while a channel on the other side of the plate carries oxidant to the cathode of another adjacent membrane electrode assembly 20. In such systems, additional flow field plates 28 having channels for carrying coolant (e.g., liquid or gas, such as cooling air) can be spaced throughout fuel cell stack 12, as needed to provide sufficient cooling of stack 12.

End plate 18a includes a fuel stream inlet port (not shown) for introducing a supply fuel stream into fuel cell stack 12. End plate 18b includes a fuel stream outlet port 35 for discharging an exhaust fuel stream from fuel cell stack 12 that comprises primarily water and non-reactive components and impurities. Fuel stream outlet port 35 is normally closed with a valve in closed fuel supply system operation.

Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant passages 30 that are in fluid communication with the fuel supply and exhaust manifolds, respectively.

End plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. Oxidant inlet port 37 is fluidly connected to the oxidant outlet port 39 via respective reactant passages 30 that are in fluid communication with oxidant supply and exhaust manifolds, respectively.

Figure 2:
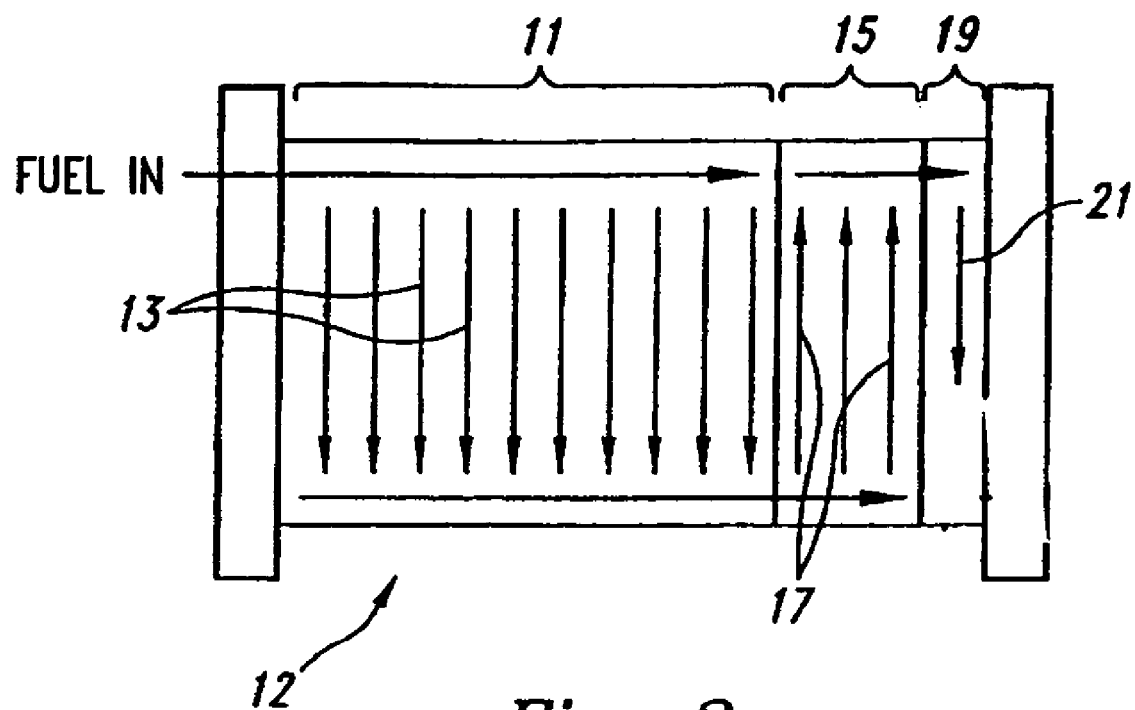
FIG. 2 is a schematic diagram representing fuel flow through a cascaded fuel cell stack of the fuel cell system of FIG. 1.

As shown in FIG. 2, fuel may be directed through fuel cell stack 12 in a cascaded flow pattern. A first set 11 of fuel cell assemblies 16 are arranged so that fuel flows within the set in a concurrent parallel direction (represented by arrows 13) that is generally opposite the direction of the flow of coolant through fuel cell stack 12. Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21), generally opposite the flow of coolant through fuel cell stack 12. The oxidant is supplied to each of the fuel cells in parallel, in the same general direction as the flow of coolant through fuel cell stack 12.

In an alternate configuration, rather than "dead-ending" fuel cell stack 12, the system may comprise a second fuel cell stack which is dead-ended and which is downstream (with respect to the direction of reactant flow), and is fluidly connected to, fuel cell stack 12. In yet another alternate configuration, rather than dead-ending fuel cell stack 12 at one location (e.g., by closing fuel outlet port 35) as shown in FIG. 1, fuel cell stack 12 may be dead-ended at a number of locations along reactant passages 30. For example, some or all of the individual fuel cell assemblies 16 may be dead-ended or fuel cell stack 12 may be divided into a number of sections, each of which is supplied with fuel and is dead-ended separately.

Each membrane electrode assembly 20 is designed to produce a nominal potential difference between anode 22 and cathode 24. Reactants (hydrogen and air) are supplied to electrodes 22, 24 on either side of ion exchange membrane 26 through reactant passages 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant passages 30 to cathode 24 where oxygen in the air reacts with protons passing through the ion exchange membrane 26 to produce product water.

With continuing reference to FIG. 1, electronic control system 14 comprises various electrical and electronic components on a circuit board 38 and various sensors 44 and actuators 46 distributed throughout fuel cell system 10. Circuit board 38 carries a microprocessor or microcontroller 40 that is appropriately programmed or configured to carry out fuel cell system operation. Microcontroller 40 can take the form of an Atmel AVR RISC microcontroller available from Atmel Corporation of San Jose, Calif. Electronic control system 14 also includes a persistent memory 42, such as an EEPROM portion of microcontroller 40 or as a discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic control system 14 until fuel cell stack 12 can provide sufficient power to the electronic control system 14. Microcontroller 40 is selectively couplable between fuel cell stack 12 and battery 47 for switching power during fuel cell system operation and/or to recharge battery 47 during fuel cell operation.

Without being bound by theory, the conditions existing in fuel cell assembly 16 operating on air and having a closed fuel supply are described. Assuming steady state conditions, there is no net diffusion of nitrogen across membrane 26. Near the inlet of anode 22 the mol fraction of nitrogen in the fuel stream is low as a relatively small amount of nitrogen diffuses across membrane 26 and enters the fuel passages. As fuel is consumed along the length of anode 22 the mol fraction of nitrogen increases. Due to convective mass flow of nitrogen and the consumption of fuel in fuel cell assembly 16, the mol fraction of nitrogen near the outlet of anode 22 may be greater than the mol fraction of nitrogen in cathode 24, in which case nitrogen will back-diffuse across membrane 26 to the cathode side. At steady state the integral of the nitrogen concentration gradient across the membrane times the cell area over the inlet of the cell (driving diffusion from cathode to anode) equals the integral of the corresponding nitrogen concentration gradient times the cell area over the outlet of the cell (driving diffusion from anode to cathode).

In a dead-ended system without anode exhaust recycling, the mol fraction of nitrogen near the outlet of anode 22 will exceed the mol fraction of nitrogen in air. Thus, a nitrogen concentration gradient will exist in anode 22. The magnitude of the concentration gradient is affected by factors including the fuel velocity in the anode flow field and the fuel stoichiometry. Increasing the fuel velocity in anode 22 will increase the convective mass flow of nitrogen toward the outlet of anode 22, increasing the concentration gradient. Fuel velocity increases with factors such as the pressure drop associated with anode 22, increased operating pressure of fuel cell assembly 16 and high loads. Decreasing the fuel stoichiometry also increases the nitrogen concentration gradient. Indeed, at a fuel stoichiometry of 1, essentially all of the fuel in anode 22 is consumed and the mol faction of nitrogen near the outlet of anode 22 approaches unity.

If the anode exhaust is recycled periodically, or a portion of the exhaust is recycled, then the nitrogen concentration gradient will be lessened, but the nitrogen concentration near the outlet of anode 22 may still be greater than the cathode nitrogen concentration. With continuous recycle of the anode exhaust, the concentration gradient may be substantially eliminated, but the nitrogen concentration in the anode flow field will equal the nitrogen concentration in the cathode flow field.

Diffused nitrogen impedes the reaction at anode 22 (due to dilution of the fuel) and ultimately may cause the performance of the fuel cell assembly 16 to drop to an unacceptable level.

By maintaining the fuel supply pressure at a sufficiently high level according to the present methods, the mol fraction of the nitrogen is well below the mol fraction of the fuel, and there is sufficient fuel (e.g., hydrogen) to sustain the anode reaction. According to the present methods, during at least some periods of operation the fuel is supplied at an overpressure (i.e. the fuel overpressure is equal to the difference between the fuel supply pressure and the oxidant supply pressure to the fuel cell assembly) of at least 5 psig. Overpressures greater than 5 psig may also be of further benefit and may improve the performance and reliability of fuel cell system 10 for reasons in addition to overcoming nitrogen diffusion across membrane 26. For example, increased fuel supply pressures are known to improve catalyst activity. The magnitude of the fuel overpressure to be used according to the present methods may be limited by the components and configuration of fuel cell system 10, particularly the tolerance of the seals and membrane 26 to increased fuel overpressure.

Temperature and other operating conditions may be optimized for particular stack configurations. For example, by employing the present methods, it may be possible to operate fuel cell system 10 at higher operating temperatures than would be practical if fuel cell system 10 was to be operated without the present methods. Increased operating temperatures may improve the performance of fuel cell systems having a closed fuel supply system by improving water management at the anode.

While the foregoing discussion has been related to the diffusion of nitrogen into the anode space of fuel cells, it is understood that the same principles apply in respect of other inert or non-reactive components present in the oxidant stream that diffuse across the fuel cell membrane.

In one embodiment of the present methods, fuel is continuously supplied to stack 12 at an overpressure of greater than 5 psig. In other embodiments, the fuel supply pressure may be varied, so that fuel is sometimes supplied at an overpressure of greater than 5 psig, while at other times the fuel is not supplied at an overpressure of greater than 5 psig. In still other embodiments, the fuel overpressure may be varied between a 5 psig overpressure and a greater overpressure. The variations may be of a constant frequency or intermittent (variable frequency), and may be either independent of or dependent on the transient operating conditions of fuel cell system 10. For example, the overpressure may be varied at predetermined intervals from the start of operation. In another embodiment, the use or the magnitude of fuel overpressure may be controlled by microcontroller 40 depending on the input received by sensors 44. In one embodiment, sensors 44 monitor one or more parameters indicative of stack or cell performance, such as the voltage of one or more cells, to e.g. detect when fuel starvation is occurring. Similarly, the use of or magnitude of overpressure may also be different during various operating phases of fuel cell system 10, such as during start-up or shut-down of fuel cell system 10. Similarly, the use of or magnitude of overpressure may be varied depending on the load on or power output of fuel cell system 10, such as during no-load or partial load conditions. For example, the overpressure may be lesser during no-load or partial load conditions than during full-load conditions. In addition, the rate of change of the load conditions may affect the desired overpressure, e.g. during transient conditions.

As discussed above, due to the flow of fuel through the fuel passages as the fuel is consumed, the non-reactive components tend to accumulate near the location(s) where fuel cell stack 12 is dead-ended. This may lead to unacceptable performance of the fuel cell assemblies 16 in the location. Accordingly, in further alternate embodiments, system configurations described above, such as systems which comprise a second fuel cell stack which is dead-ended or systems in which fuel cell stack 12 is dead-ended at a number of locations along the fuel flow path, may be employed to mitigate such effects. For example, in a system comprising a second fuel cell stack, which is dead-ended and which is fluidly connected downstream (with respect to the direction of reactant flow) to the primary fuel cell stack, the non-reactive components will tend to accumulate in the second "dead-ended" fuel cell stack. In this way, the performance of the primary fuel cell stack will be preserved.

As described above, according to the present methods, fuel cell system 10 may be operated without the need for intermittent purges by maintaining the fuel supply pressure at a level sufficiently greater than the oxidant pressure. Thus, a purging system is not a required component of fuel cell system 10. However, it may be desirable for fuel cell system 10 to retain the ability to purge, and accordingly, in alternate embodiments, fuel cell system 10 may include purging equipment. For example, the final set 19 of fuel cell assemblies 16 in FIG. 2 may comprise a purge cell portion of the fuel cell stack in which non-reactive components, including nitrogen, may be vented by opening a purge valve. (Although fuel cell stack 12 is designed to consume substantially all of the hydrogen fuel supplied to it during operation, traces of unreacted hydrogen may also be discharged through the fuel stream outlet port 35 (FIG. 1) during a purge of fuel cell stack 12.)

Accordingly, in some embodiments of the present methods, purging may be used in conjunction with fuel overpressure. For example, the purging system may be activated periodically, or as necessary, depending on system performance. See, for example, commonly assigned U.S. patent application Publication No. 2003/0022041, now U.S. Pat. No. 6,960,401, which is incorporated herein by reference in its entirety. In yet another embodiment of the present methods, overpressure may be used in conjunction with a continuous small bleed of the fuel stream from the anode side of fuel cell stack 12. See, for example, U.S. patent application Ser. No. 10/253,390 (now U.S. Pat. No. 6,926,987), which is incorporated herein by reference in its entirety. The bleed location(s) can be selected such that they are in the vicinity of where nitrogen is most likely to accumulate, such as where the stack and/or individual cell(s) are dead-ended, as discussed above.

The following examples have been included to illustrate different embodiments and aspects of the present methods but they should not be construed as limiting in any way.

EXAMPLE 1

The cell voltage of the individual cells of a Ballard fuel cell stack (10 cells) was monitored. The stack was closed on the fuel side, and was operated at a coolant inlet temperature of about 70° C., with the fuel cell stack producing about 150 mA/cm$^2$. Air was supplied to the stack as the oxidant at a constant pressure of approximately 10 psig, a stoichiometry of approximately 1.8 and a relative humidity of approximately 73%. (Stoichiometry is the ratio of fuel or oxidant supplied to that consumed in the generation of electrical power in the fuel cell.) Substantially pure hydrogen was supplied to the stack at a stoichiometry of about 1.0 and a relative humidity of approximately 67%. The pressure of the hydrogen supplied was varied from about 10 psig (fuel overpressure≈0 psig) to about 40 psig (fuel overpressure≈30 psig). The stack was not purged during the test period.

Figure 3:
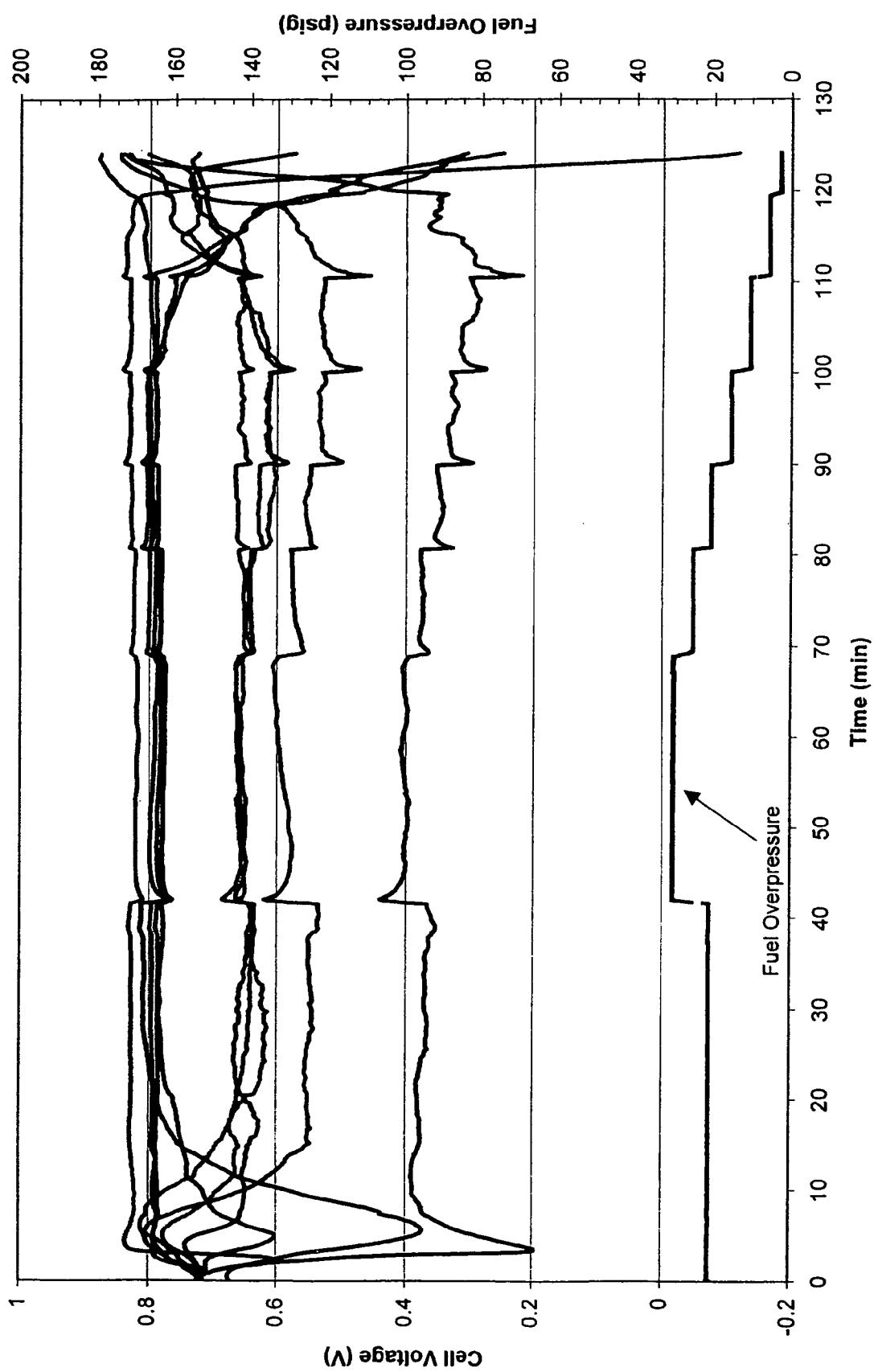
FIG. 3 is a graph showing the cell voltage over time for a fuel cell stack operated with fuel overpressures from 0 to 30 psig.

FIG. 3 shows the voltage of the individual cells over time as the fuel overpressure was varied. As shown in FIG. 3, the stack operated continuously, without the need for fuel purges, for approximately 2 hours so long as the fuel pressure was at least 5 psig greater than the oxidant pressure (time=0 to time=120 minutes). As can be seen from FIG. 3, although the voltage of half of the cells was lower than the others during that period, the performance of the lower voltage cells was nonetheless stable. However, once the fuel overpressure was reduced below about 5 psig, the performance of some of the cells started to drop significantly.

Figure 4:
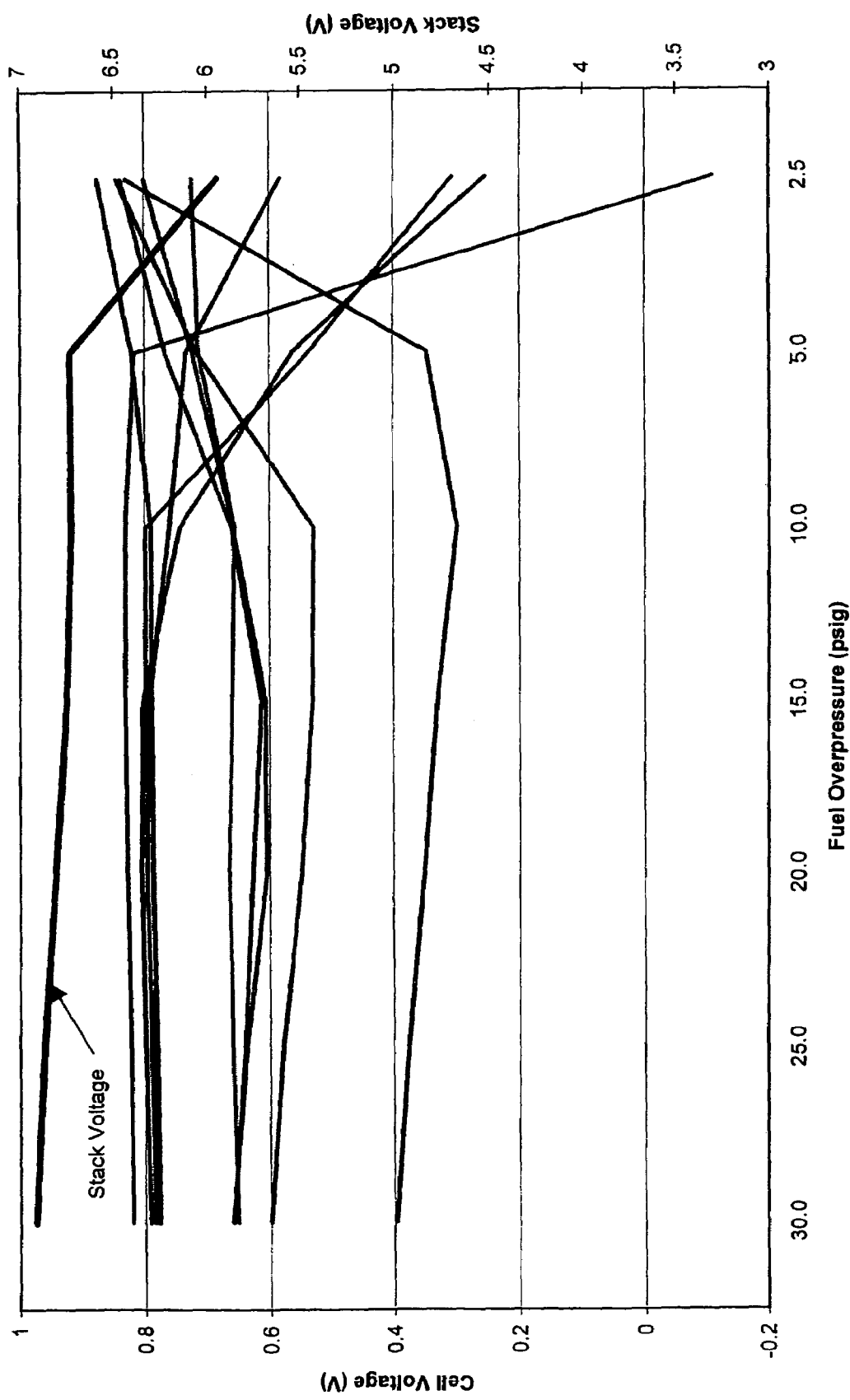
FIG. 4 is a graph showing the voltage of the individual cells as well as the stack voltage versus the fuel overpressure.

FIG. 4 is an extract from the FIG. 3 data, showing the voltage of the individual cells and the stack at the various fuel overpressures. Again, as can be seen from the figure, the cells were able to operate without any stack purging when the fuel overpressure was greater than about 5 psig. Their performance began to drop significantly once the fuel overpressure was reduced below 5 psig.

EXAMPLE 2

The cell voltage of a 47 fuel cell NEXA™ stack was monitored. The stack was closed on the fuel side, and was operated at a coolant inlet temperature of about 65° C., with the fuel cell stack producing about 432 mA/cm$^2$. Air was supplied to the stack as the oxidant at a constant pressure of approximately 2.25 psig, a stoichiometry of approximately 2.0 and a relative humidity of approximately 90–95%. Substantially pure unhumidified hydrogen was supplied to the stack at a pressure of approximately 14.25 psig and a stoichiometry of about 1.0 (fuel overpressure≈12 psig). After approximately 64 hours, the coolant inlet temperature was increased to about 75° C. and the stack was operated for approximately 2 additional hours, after which the test was stopped. The stack was not purged during the test period.

Figure 5:
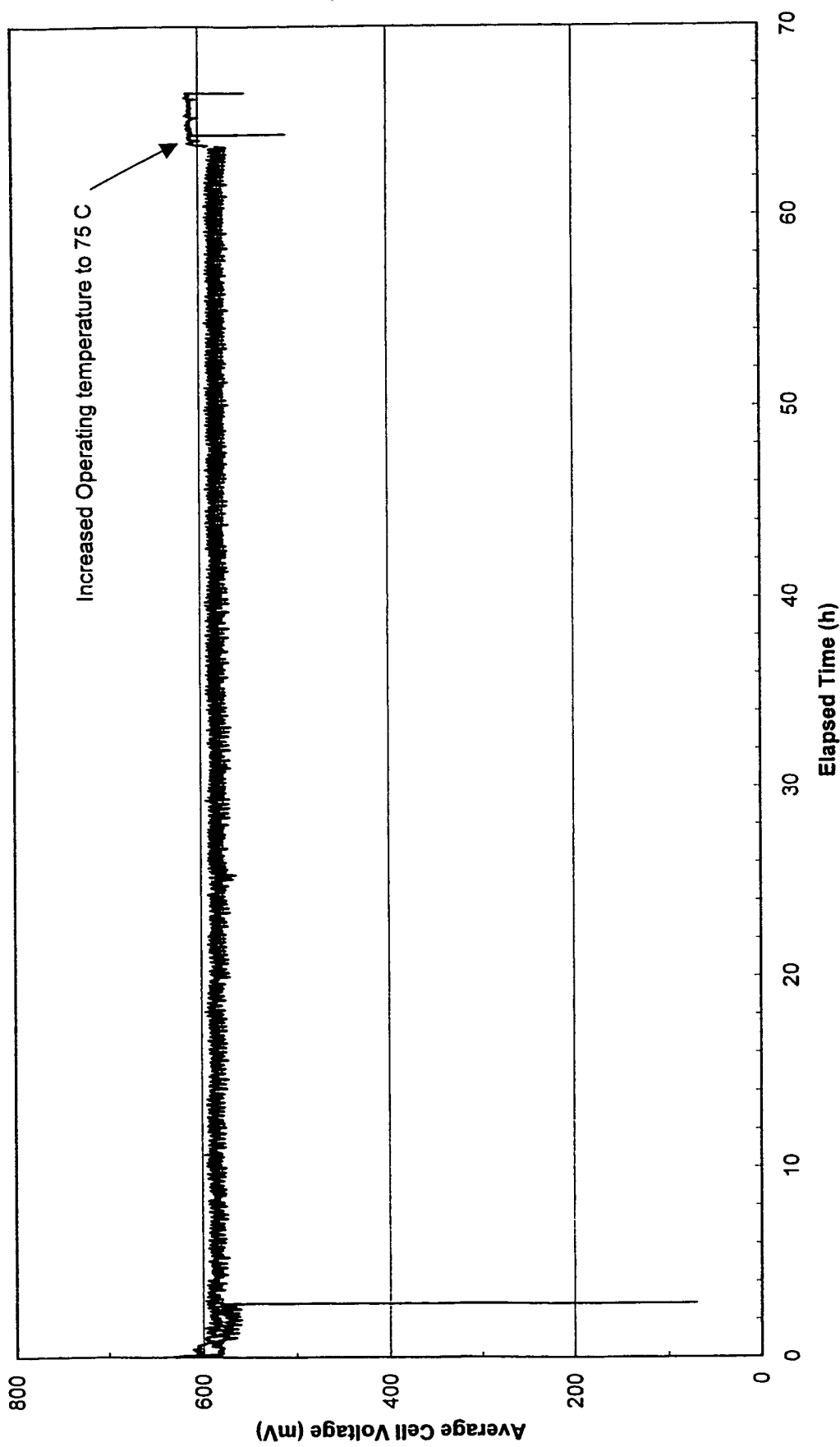
FIG. 5 is a graph showing the average cell voltage of the fuel cells of a fuel cell stack operated with fuel overpressure according to one embodiment of the present methods.

FIG. 5 shows the average cell voltage over time during the above test period (i.e. closed fuel side operation with substantially constant fuel overpressure). As shown in FIG. 5, the stack operated continuously, without the need for fuel purges, for over 63 hours at a coolant inlet temperature of 65° C., and an additional 2 hours at a coolant inlet temperature of 75° C. As can be seen from FIG. 5, increasing the coolant inlet temperature improved the average cell voltage.

It can be advantageous to use the above described methods, involving use of a fuel overpressure, in fuel cell systems that are dead-ended on the fuel side but have a fuel recirculation loop. In such configurations the accumulation of nitrogen and non-reactive components on the anode side (in the fuel loop) can be mitigated by use of a fuel overpressure.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

We claim:

1. A method for operating a fuel cell system comprising at least one fuel cell stack, the stack comprising at least one fuel cell, the fuel cell system further comprising a reactant supply system, the reactant supply system comprising a fuel passage for directing a fuel stream through the stack and an oxidant passage for directing an oxidant stream through the stack, the method comprising:
   supplying the oxidant stream to the oxidant passage at an oxidant supply pressure; and
   supplying the fuel stream to the fuel passage at a fuel supply pressure;
   wherein the fuel supply pressure is at least 5 psig greater than the oxidant supply pressure at least some of the time and a fuel side of the reactant supply system is closed at least some of the time.

2. The method of claim 1, wherein the at least one fuel cell is a solid polymer electrolyte fuel cell.

3. The method of claim 2, wherein the fuel stream is hydrogen and the oxidant stream is air.

4. The method of claim 1, wherein during operation the fuel supply pressure is always at least 5 psig greater than the oxidant supply pressure.

5. The method of claim 4, further comprising:
   varying the fuel supply pressure.

6. The method of claim 5, wherein the fuel supply pressure is varied at a substantially constant frequency.

7. The method of claim 5, wherein the fuel supply pressure is varied based on the power output of the fuel cell system.

8. The method of claim 5, wherein the fuel cell system further comprises at least one sensor, and varying the fuel supply pressure comprises varying the fuel supply pressure based on an output of the sensor.

9. The method of claim 5, further comprising:
   monitoring a parameter indicative of fuel cell performance,
   wherein the fuel supply pressure is varied based on the parameter indicative of fuel cell performance.

10. The method of claim 1, further comprising:
    varying the fuel supply pressure,
    wherein the fuel supply pressure is intermittently at least 5 psig greater than the oxidant supply pressure.

11. The method of claim 10, wherein the fuel supply pressure is varied at a substantially constant frequency.

12. The method of claim 10, wherein the fuel supply pressure is at least 5 psig greater than the oxidant supply pressure during at least one of a shut-down phase and a start-up phase of the fuel cell system.

13. The method of claim 10, wherein the fuel supply pressure is varied based on the power output of the fuel cell system.

14. The method of claim 10, wherein the fuel cell system further comprises at least one sensor, and varying the fuel supply pressure comprises varying the fuel supply pressure based on an output of the sensor.

15. The method of claim 10, further comprising:
    monitoring a parameter indicative of fuel cell performance,
    wherein the fuel supply pressure is varied based on the parameter indicative of fuel cell performance.

16. The method of claim 1, wherein the fuel side of the reactant supply system is always closed.

17. The method of claim 1, wherein the fuel side of the reactant supply system comprises a purge valve which is periodically opened to discharge a portion of the fuel stream from the stack.

18. The method of claim 1, wherein the fuel side of the reactant supply system further comprises a recirculation loop and the method further comprises recirculating the fuel stream through the stack.

19. The method of claim 18, wherein the fuel side of the reactant supply system further comprises a purge valve, and the method further comprises periodically opening the purge valve to discharge a portion of the fuel stream from the stack.

20. The method of claim 1, wherein the fuel side of the reactant supply system is closed at a plurality of locations.

21. The method of claim 1, wherein the stack comprises a plurality of fuel cells, and a fuel side of at least one fuel cell is dead-ended.

22. The method of claim 21, wherein the fuel side of each fuel cell is dead-ended.

23. The method of claim 1, wherein the fuel cell system comprises a primary stack and a secondary stack fluidly connected to receive the fuel stream in series downstream of the primary stack, wherein a fuel passage of the secondary stack is dead-ended at least some of the time.

24. The method of claim 1, wherein the fuel supply pressure is between about 5 psig and 30 psig greater than the oxidant supply pressure.

25. The method of claim 1, wherein the fuel supply pressure is at least 10 psig greater than the oxidant supply pressure.

26. The method of claim 1, wherein the fuel supply pressure is at least 5 psig greater than the oxidant supply pressure when the fuel side of the reactant supply system is closed.

* * * * *